J. F. O'CONNOR.
FRICTION GEAR.
APPLICATION FILED APR. 1, 1918.
1,302,078.
Patented Apr. 29, 1919.
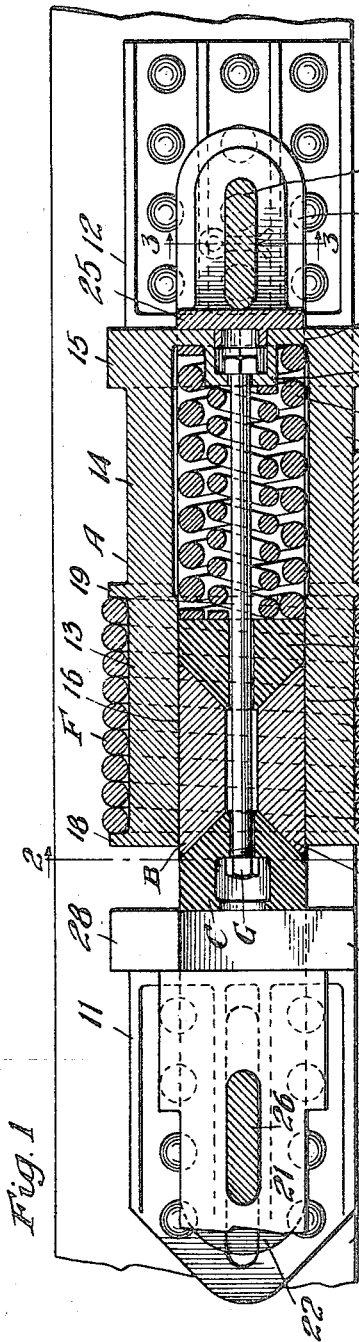
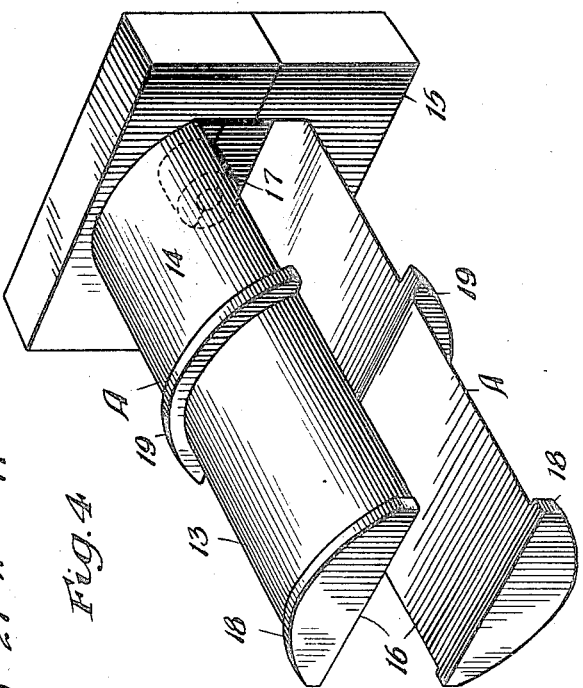
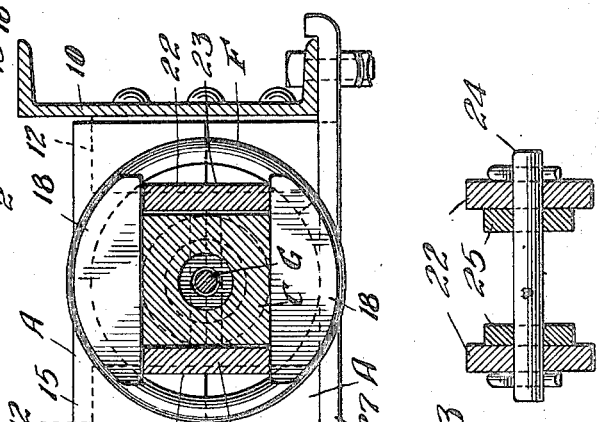
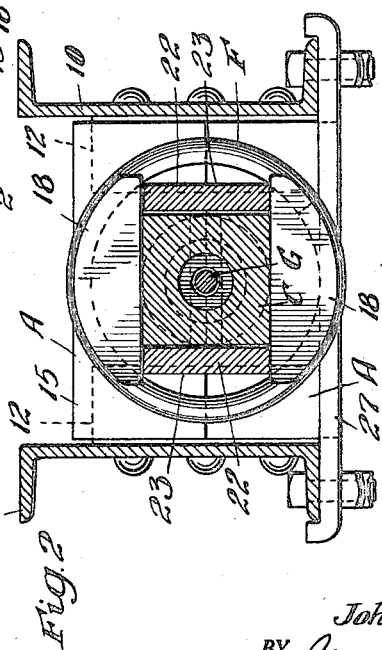
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR.

1,302,078.

Specification of Letters Patent.

Patented Apr. 29, 1919.

Application filed April 1, 1918. Serial No. 225,836.

*To all whom it may concern:*

Be it known that I, JOHN F. O'CONNOR, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

One object of the invention is to provide a friction gear, more especially adapted for railway draft riggings and wherein is employed a resilient friction shell.

Another and more specific object of the invention is to provide a friction gear employing a shell that is adapted to automatically assume a tapered bore after the pressure is applied and thereby provide a differential wedging action.

Other objects of the invention will more clearly appear from the description hereinafter following.

In the drawing forming a part of this specification, Figure 1 is a longitudinal, vertical, sectional view of a railway draft rigging showing my improvements in connection therewith. Fig. 2 is a vertical, transverse, sectional view, taken on the line 2—2 of Fig. 1. Fig. 3 is a detail, sectional view, taken substantially on the line 3—3 of Fig. 1. And Fig. 4 is a perspective view of the castings entering into the expansible friction shell.

In said drawing, the draft sills are shown at 10 and to the inner faces thereof are secured front and rear stops 11 and 12.

The improved shock absorbing mechanism includes a friction shell formed of the castings A—A, friction shoes B—B, outer wedge C, inner wedge D, main spring E, retaining spring F and connecting bolt G.

The castings A—A are preferably made duplicates and each consists of an elongated arm having a friction shell section proper 13 near its outer end and a spring casing section 14 intermediate the section 13 and the rear integral, semi-follower 15. The arms of each casting A are substantially of segmental form in cross section, as appears from Figs. 2 and 4, and when assembled, the inner friction faces 16—16 near their outer ends normally extend parallel to the axis of the gear. The semi-follower rear ends 15, when brought together, are adapted to act as the rear follower of the gear and bear against the rear stops 12. Said semi-follower sections 15 are provided on their inner faces with inwardly extending semi-bosses 17, which together form a suitable boss for receiving the rear end of the outer heavy coil of the main spring E.

At their forward ends, the arms of the castings A are provided with outwardly extending flanges 18 and 19 at points opposite the outer and inner ends of the friction shell section 13 and the retaining coil spring F encircles the castings A—A and is confined by said flanges 18 and 19, as will be apparent from an inspection of Fig. 1.

The friction shoes B are two in number and each is beveled at both ends so as to coöperate with the inner and outer wedges C and D. The forward end of the main spring E bears against the inner wedge D and thereby offers resistance to relative movement between the wedges and shoes and the friction shell.

A front follower 20 is employed between the front wedge C and the draw bar 21, and to operatively connect the draw bar with the shock absorbing mechanism, I employ a pair of side links 22—22, which extend within the retaining coil F and between the arms of the castings A. Said side links 22 are passed through suitable recesses 23 in the rear ends of the castings A and are connected at the rear of the castings A by a cross-key 24. A filler casting 25 is also employed at the rear of the castings A and mounted on said key 24. The side links at their forward ends are connected to the draw bar by a coupler-key 26. The friction mechanism proper is supported by a saddle plate 27 and the front follower 20 is supported by the links 22 by means of upper laterally extended shoulders 28 which rest upon said links.

By arranging the side links in the manner described, it is evident that the same are brought close against the side walls of the draw bar butt to thereby provide a stronger key connection between said links and the draw bar.

By forming the friction shell in sections and retaining the sections in proper position by means of an exterior enveloping spring coil, the castings are relieved of all bursting stresses, such as are incident to the usual friction shell. Furthermore, by employing the flexible or resilient enveloping spring coil F, the friction shell itself becomes resilient and will expand slightly as the pressure from the wedges and friction shoes increases. Not only will the friction shell thus expand, but the expansion will take place primarily at the outer end of the friction shell so as to give the effect of a friction shell which is tapered inwardly from its outer end and thus produce a differential wedging action similar to the differential wedging action obtained in the ordinary type of tapered friction shell.

I claim:

1. In a draft rigging, the combination with a friction shell comprising a pair of parallelly arranged arms and a coiled spring enveloping said arms, of friction shoes coöperable with said shell, wedge means coacting with said shoes, a spring for resisting relative movement between said shell and said shoes, a draw bar, and yoke-acting means for connecting said draw bar and the shock absorbing mechanism, said yoke-acting means comprising a pair of arms extending longitudinally between the arms of said friction shell.

2. In a friction shock absorbing mechanism, the combination with an expansible shell comprising a plurality of elements and a yieldable surrounding medium, of a plurality of friction elements disposed within said shell and coöperable therewith, and spring means disposed within said shell and adapted to resist relative movement between the shell and said friction elements.

3. In a draft rigging, the combination with an expansible friction shell including a plurality of elements and an encircling spring, of friction elements coöperable with said shell, spring means adapted to resist relative movement between said elements and said shell, a draw bar, and yoke-acting means for operatively connecting the shock absorbing mechanism with the draw bar, said yoke-acting means passing longitudinally within said encircling spring.

In witness that I claim the foregoing I have hereunto subscribed my name this 28th day of March, 1918.

JOHN F. O'CONNOR.